United States Patent [19]

Ruland

[11] 4,428,697
[45] Jan. 31, 1984

[54] DEVICE ADAPTED FOR CLAMPING TO A ROTATABLE SHAFT

[75] Inventor: Frederick F. Ruland, Weston, Mass.

[73] Assignee: Ruland Manufacturing Company, Inc., Watertown, Mass.

[21] Appl. No.: 271,568

[22] Filed: Jun. 8, 1981

[51] Int. Cl.³ .............................................. F16D 10/6
[52] U.S. Cl. .............................. 403/344; 74/573 R; 403/290; 403/313
[58] Field of Search ............... 403/344, 362, 373, 375, 403/290, 309, 313, 256, 312; 74/573 R

[56] References Cited

U.S. PATENT DOCUMENTS 3,139,296  6/1964  Greene ............................... 403/373
3,868,193  2/1975  Schott ................................ 403/344

Primary Examiner—Andrew V. Kundrat
Assistant Examiner—Joseph A. Fischetti
Attorney, Agent, or Firm—Lahive & Cockfield

[57] ABSTRACT

A device for clamping to a rotatable shaft including a C-shaped member and a screw for selectively biasing the end portions of the C-shaped member toward each other so that the inner surface of the C-shaped member is in contact with the shaft. The C-shaped member includes a balancing hole which is offset so that the device is substantially balanced when clamped to the shaft.

1 Claim, 3 Drawing Figures

DEVICE ADAPTED FOR CLAMPING TO A ROTATABLE SHAFT

BACKGROUND OF THE INVENTION

This invention relates to accessories for machine tools, and more particularly to clamp collars and shaft couplings.

It is well known in the art to provide clamp collars and shaft couplings which may be removably mounted on a rotating shaft, for example, of a rotating machine. Typical clamp collars and shaft couplings are generally C-shaped and include a flexure portions between their end portions. A screw coupling for the two end portions, is adapted for drawing those end portions towards each other in a manner securing the collar, or coupling, at its inner surface to the shaft.

The conventional clamp collars and shaft couplings, however, generally introduce dynamic instabilities in the rotating assemblies to which they are attached due to unbalanced moments about the axis of rotation. Such moments are caused by the non-uniformity of mass distribution in the regions of the flexure portion and the end portions and screw. The dynamic instabilities result in substantial limitations in the angular velocity at which the shaft may be driven.

It is an object of the present invention to provide a new and improved clamp collar.

Another object is to provide a new and improved shaft coupling.

SUMMARY OF THE INVENTION

Briefly, the present invention is a device adapted for clamping to a rotatable shaft having a radius R. By way of example, the device may be a shaft coupling, or a clamp collar.

The device includes an elongated member having two end portions and an intermediate portion between those end portions. The elongated member is substantially C-shaped about a central axis and has an outer surface and an inner surface. The intermediate portion further includes a "flexure-defining and balancing" (FD/B) hole. The FD/B hole has a cylindrical portion with a principal axis parallel to the central axis. The FD/B hole is positioned in the intermediate portion in a manner interrupting, or splitting, the inner surface into two portions, each portion having a nominal radius of curvature level to R. The FD/B hole extends radially outward from the inner surface portions, to thereby establish a flexure region in the intermediate member.

A screw configuration is adapted for selectively biasing the end portions of the elongated member toward each other. In one form, the screw configuration includes a cap screw which is seated in a cylindrical hole in one end portion. The screw is threaded into a mating hole in the other end portion. The screw may be adjustably positioned so that the two inner surface portions are aligned to define a cylindrical surface about the central axis, having radius R.

The cylindrical portion of the FD/B hole has a predetermined radius, and is angularly offset with respect to the end portions, and is radially offset with respect to the mean radius of the device in a manner so that the device is substantially balance about the central axis when the inner surface portions form the cylindrical surface having radius R.

With this configuration, the device is dynamically balanced, and when coupled to a rotating shaft, there are no unbalanced moments which cause vibration.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
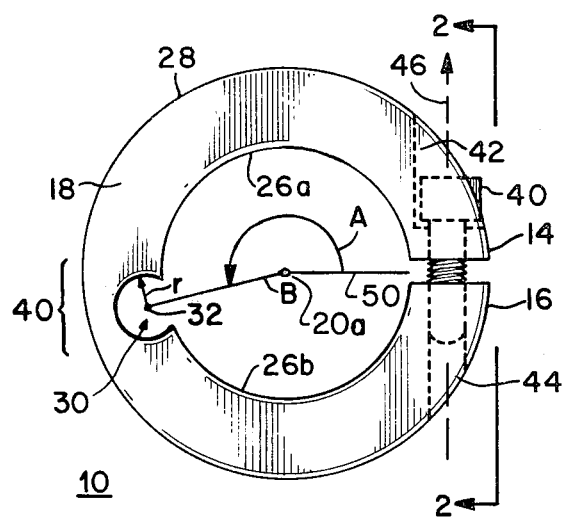
FIGS. 1 and 2 show a clamp collar embodying the present invention.
Figure 2:
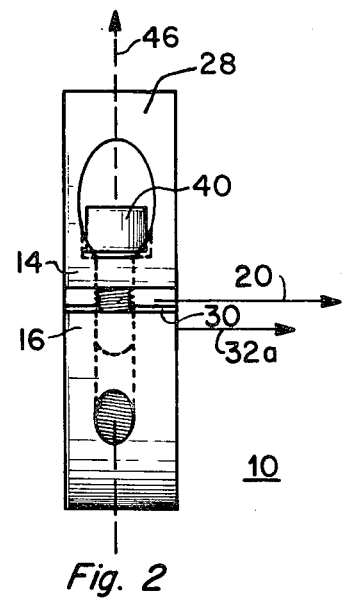

FIGS. 1 and 2 show a clamp collar 10 in accordance with the present invention. The collar 10 includes an elongated member having end portions 14 and 16 and an intermediate portion 18 between those end portions. The elongated member is generally C-shaped about a central axis 20, that is, the elongated member is generally toroidal with a gap between end portions 14 and 16, where the toroidal elongated member is generally symmetrical about axis 20.

The elongated member has an inner surface 26 and an outer surface 28. In this exemplary embodiment, the surface 26 includes two generally cylindrical sections 26a and 26b, each having a nominal radius of curvature R, which corresponds to the outer radius of a rotatable shaft to which the clamp collar 10 might be attached.

The intermediate portion 18 includes a "flexure-defining and balancing" (FD/B) hole 30. Hole 30 is generally cylindrical, having its central or "hole" axis 32a parallel to the central axis 20 and passing through the point 32 (as shown in FIG. 1). The FD/B hole 30 splits the inner surface 26 into two portions 26a and 26b. The FD/B hole 30 extends radially outward from that inner surface. With this configuration, the region of intermediate portion 18 denoted by reference designation 40 in FIG. 1, may be characterized as a flexure region, since the relative dimensions of that region permit bending of the intermediate portion 18 about axes parallel to central axis 20. The FD/B hole 30 has a predetermined radius, r, and is angularly offset with respect to the center line between the end portions 14 and 16 by an angle A, and is radially offset from the central axis 20 by B. The values for r, A and B are selected so that the device is substantially balanced about the central axis 20 when the end portions 14 and 16 are positioned so that the inner surface 26a and 26b form a cylindrical surface about axis 20.

The elongated member includes a screw configuration for selectively biasing the end portions 14 and 16 towards each other. This configuration includes a screw 40 which is adapted for seating in a hole 42 near end portion 14 and is adapted for being threaded into a mating hole 44 near end portion 16. Holes 42 and 44 are generally coaxial about an axis 46. With this configuration, the screw 40 may be rotated in a manner bringing end portions 14 and 16 together so that the inner surface portions 26a and 26b form a cylindrical surface about axis 20 having a radius R.

Figure 3:
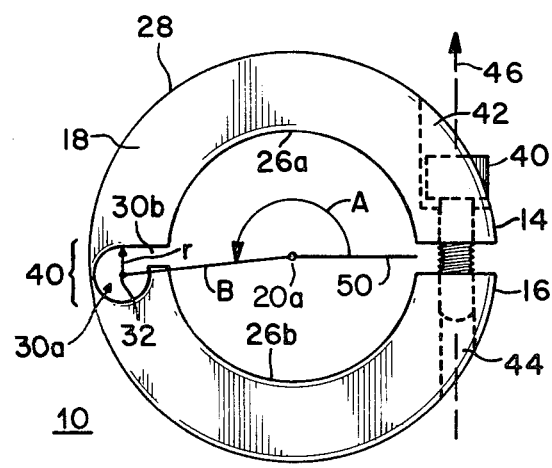
FIG. 3 shows another clamp collar embodying the present invention.

FIG. 3 shows an embodiment of a clamp collar 10a similar to that of FIGS. 1 and 2 but where the FD/B hole 30 includes both a cylindrical portion 30a and a slot portion 30b. The cylindrical portion 30a is suitably dimensional and positioned to balance the clamp collar 10a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A device adapted for clamping to a rotatable shaft having radius R, comprising:
   A. an elongated member having two end portions and an intermediate portion between said end portions, said elongated member being C-shaped about a central axis and having an outer surface and an inner surface, and said intermediate portion including a flexure-defining and balancing (FD/B) hole, interrupting and extending radially outward from said inner surface, thereby establishing a flexure region in said intermediate portion, said FD/B hole including a cylindrical portion having a hole axis parallel to said central axis and
   B. a screw means for selectively biasing said end portions toward each other whereby the radius of said inner surface about said central axis equals R, wherein said cylindrical portion of the FD/B hole has a predetermined radius and has its hole axis angularly offset about said central axis with respect to a center line passing through said central axis and midway between said end portions, and wherein said cylindrical hole has its hole axis radially offset with respect to the mean radius of said device when the radius of said inner surface equals R, whereby said device is substantially balanced about said central axis.

* * * * *